(12) United States Patent
Goldstein et al.

(10) Patent No.: US 8,032,522 B2
(45) Date of Patent: Oct. 4, 2011

(54) OPTIMIZING PARAMETERIZED QUERIES IN A RELATIONAL DATABASE MANAGEMENT SYSTEM

(75) Inventors: Jonathan D. Goldstein, Kirkland, WA (US); Per-Ake Larson, Redmond, WA (US); Jingren Zhou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 280 days.

(21) Appl. No.: 11/467,377

(22) Filed: Aug. 25, 2006

(65) Prior Publication Data

US 2008/0052266 A1 Feb. 28, 2008

(51) Int. Cl.
*G06F 17/30* (2006.01)
*G06F 15/16* (2006.01)

(52) U.S. Cl. ........................................ 707/718; 707/719

(58) Field of Classification Search .................. 707/1, 2, 707/3, 4, 5, 713, 718, 719, 999.001–999.005
See application file for complete search history.

(56) References Cited

U.S. PATENT DOCUMENTS

| | | | |
|---|---|---|---|
| 5,301,317 A | 4/1994 | Lohman et al. | |
| 5,812,996 A * | 9/1998 | Rubin et al. ........................... | 1/1 |
| 6,029,163 A | 2/2000 | Ziauddin | |
| 6,067,542 A | 5/2000 | Carino, Jr. | |
| 6,356,887 B1 * | 3/2002 | Berenson et al. .................. | 707/2 |
| 6,366,901 B1 * | 4/2002 | Ellis ........................ | 1/1 |
| 6,411,951 B1 | 6/2002 | Galindo-Legaria et al. | |
| 6,581,055 B1 * | 6/2003 | Ziauddin et al. ................... | 707/4 |
| 6,615,203 B1 | 9/2003 | Lin et al. | |
| 6,763,359 B2 | 7/2004 | Lohman et al. | |
| 6,985,904 B1 * | 1/2006 | Kaluskar et al. ....................... | 1/1 |
| 7,353,219 B2 | 4/2008 | Markl et al. | |
| 2003/0009446 A1 * | 1/2003 | Agarwal et al. ................... | 707/2 |
| 2003/0093408 A1 * | 5/2003 | Brown et al. ....................... | 707/2 |
| 2003/0172059 A1 * | 9/2003 | Andrei ............... | 707/3 |
| 2003/0200204 A1 * | 10/2003 | Limoges et al. ................... | 707/3 |
| 2004/0260684 A1 * | 12/2004 | Agrawal et al. ................... | 707/3 |
| 2005/0120000 A1 * | 6/2005 | Ziauddin et al. ................... | 707/3 |
| 2005/0192951 A1 | 9/2005 | Day et al. | |
| 2005/0267866 A1 * | 12/2005 | Markl et al. ....................... | 707/2 |
| 2005/0289098 A1 * | 12/2005 | Barsness et al. ................... | 707/1 |
| 2006/0004695 A1 * | 1/2006 | Day et al. .......................... | 707/2 |
| 2006/0026116 A1 | 2/2006 | Day et al. | |
| 2006/0085375 A1 * | 4/2006 | Egan et al. ......................... | 707/1 |
| 2006/0224563 A1 * | 10/2006 | Hanson et al. ..................... | 707/2 |
| 2006/0259460 A1 * | 11/2006 | Zurek et al. ....................... | 707/2 |
| 2007/0220017 A1 * | 9/2007 | Zuzarte et al. ................ | 707/100 |

(Continued)

OTHER PUBLICATIONS

Guravannavar, R., et al.; Optimizing Nested Queries with Parameter Sort Orders; 2005; 12 pages.

(Continued)

*Primary Examiner* — Jacob F Betit
*Assistant Examiner* — Dennis Truong
(74) *Attorney, Agent, or Firm* — Lee & Hayes, PLLC

(57) ABSTRACT

Parameterized queries are optimized by a transformational optimizer. The optimizer produces a dynamic plan that embeds multiple plan options that may be selected to execute a particular query. Parameter distribution improves query execution efficiency and performance by exploring a sample parameter space representative of the parameter values actually used. The dynamic plans can be simplified while maintaining an acceptable level of optimality by reducing the number of plan options. The reduction is achieved by eliminating switch unions to alternatives that are close in cost. Both approaches of parameter space exploration and dynamic plan generation are deeply integrated into the query optimizer.

10 Claims, 13 Drawing Sheets

U.S. PATENT DOCUMENTS

2007/0226178 A1* 9/2007 Ewen et al. .................. 707/2

OTHER PUBLICATIONS

Query Processing Using HP NonStop SQL/MP Software; 2004; 12 pages.

Pentaris, et al. "Distributed Query Optimization by Query Trading" ACM Transactions on Database Systems (TODS) vol. 31 Issue 2, Jun. 2006, 12 pages.

* cited by examiner

800

Physical Requirements: R
Optimal Cost: 100
Optimal Group Expression: 10.3
Optimal Child Contexts: (5.2, 7.4)

FIG. 8

```
Physical Requirements: R
Optimal Cost:           | 130 | ................. | 100 |
Optimal Group Expression: | 10.2 | ...... | 10.3 |
Optimal Child Contexts:   | (Ptr, Ptr, Ptr) | ... | (Ptr, Ptr) |
```

OPTIMIZING PARAMETERIZED QUERIES IN A RELATIONAL DATABASE MANAGEMENT SYSTEM

BACKGROUND

Query execution in SQL (Structured Query Language) is an integral part of system performance in terms of efficiency, time, accuracy, and cost. The way in which a query is executed can avoid or create problems regarding the quantity of space that needs to be sacrificed to execute the query and the amount of time required to retrieve the query result.

In an RDBMS (Relational Database Management System), users issue queries against the data that is stored in software constructs. When a user issues a query, the system compiles the query by producing a physical plan that can be executed against the database. For any such query, there are a variety of different physical plans that can be appropriately used. However, each plan is different—some plans will execute the query with a low cost, while other plans will execute the query with a high cost. The step of optimizing a query execution process by costing various plans is inherently expensive.

Therefore, for a class of queries that are similar to one another, one could use the same physical plan to execute those queries and costing could be performed only once for the whole class of queries. In SQL, these queries are identified as parameterized queries, where a user can submit a query with constants missing—those constants are not provided until runtime. In this situation, just one plan will be generated and stored in the plan cache for every query that belongs in that class of queries, effectively avoiding the cost of optimizing more than once for these queries. However, depending on the constant selected, there can be a dramatically wide range of plans corresponding to different costs.

One approach in plan selection is to optimize the first query submission with constants in place and use the selected plan for all subsequent queries in that cost. Another approach in plan selection is to provide the optimizer with a hint when submitting the parameterized query so that optimization will use the suggested constant to generate a plan.

While such approaches ensure that an optimal plan is selected for at least one constant, different plans have different levels of optimality for different constants. Selecting a single plan will almost always be suboptimal for at least some other parameter setting that does not correspond to the initial optimization approach. Thus, a plan that may perform well for some parameter values may perform poorly for other parameter values. In addition, there are parameterized queries for which no plan achieves close to optimal performance. Current database systems do not have a reasonable automatic response to such situations.

SUMMARY

The following presents a simplified summary of the claimed subject matter in order to provide a basic understanding of some aspects described herein. This summary is not an extensive overview and is not intended to identify key/critical elements or to delineate the scope of the claimed subject matter. Its sole purpose is to present a summary of the following detailed description of preferred embodiments of the invention.

A transformational optimizer produces a dynamic plan that automatically selects an appropriate plan option at the start of query execution for particular parameter settings in a parameterized query. The dynamic plan embeds more than one plan option within the plan so that selection of a particular plan option can occur at runtime, depending on the constants being provided. The optimizer generates such a dynamic plan at a reasonable cost.

The dynamic plan generation algorithm is deeply integrated in the query optimizer. Integration prevents the system from invoking the optimizer from outside, saving substantial time and cost involved in repeating unnecessary work and inefficiently exploring the plan space. That is, probing the optimizer externally is an expensive and inefficient way to explore plan space.

In addition, integration enables the system to conveniently retain costing information on all plan options at least until the end of optimization—including those plan options that were suboptimal in the analysis. Since costing analysis is an approximate process, there may be, for instance, three competing plan options that are so close to one another that they are equivalent in cost from a practical perspective. When optimal plan selection is beyond the capability of the costing engine, the overall effect is a random selection of relatively close plan options. From outside the optimizer, such information is not communicated. From within the optimizer, the algorithm incorporates such information to simplify the dynamic plan. The optimizer makes a determination that the costing of plan options is so close that the particular plan selection is not important enough to be worth the extra analytical work.

Parameter distribution is an approach to provide information regarding which parameter settings are most interesting to calculate optimal plans. Rather than exploring the entire space to figure out which plan is the right plan for an entire domain of possible parameter values, parameter distribution explores just a sample space. The plan space for any given system could be extensively large and complicated, and could include many plans that are rarely used. Therefore, it is more efficient to optimize over a sample of parameter values that users actually select to run queries. Especially in cases where there is no clear correlation between parameter values and the cost of the resulting plan, it can be inaccurate to neatly cut the parameter space into regions for optimization. When the plans are uniformly scattered across the parameter space, such parameter distribution sampling more accurately focuses on the values of relevance in the domain.

Furthermore, a user can trade off optimality for simplicity in dynamic plan generation. To simplify a dynamic plan, switch unions (operators that assist in the selection of a plan from a group of alternative plans) may be eliminated to reduce the number of plan options at the slight expense of optimality. For example, if a dynamic plan has five different plan options, but three of them are similar in cost to two of the plan options, the plan can be reduced to just two alternatives, rather than five. While such a configuration may be slightly suboptimal, the resources saved in simplifying the dynamic plan structure is worth the trade off. In connection with the trade off, the user can select a bound to ensure that the reduced dynamic plan is still within the necessary standards of optimality.

To the accomplishment of the foregoing and related ends, certain illustrative aspects are described herein in connection with the following description and the annexed drawings. These aspects are indicative, however, of but a few of the various ways in which the principles of the claimed subject matter may be employed, and such subject matter is intended to include all such aspects and their equivalents. Other advantages and novel features may become apparent from the following detailed description when considered in conjunction with the drawings.

BRIEF DESCRIPTION OF THE DRAWINGS

FIG. 8 is an example of a physical optimization context.

DETAILED DESCRIPTION

Figure 1:
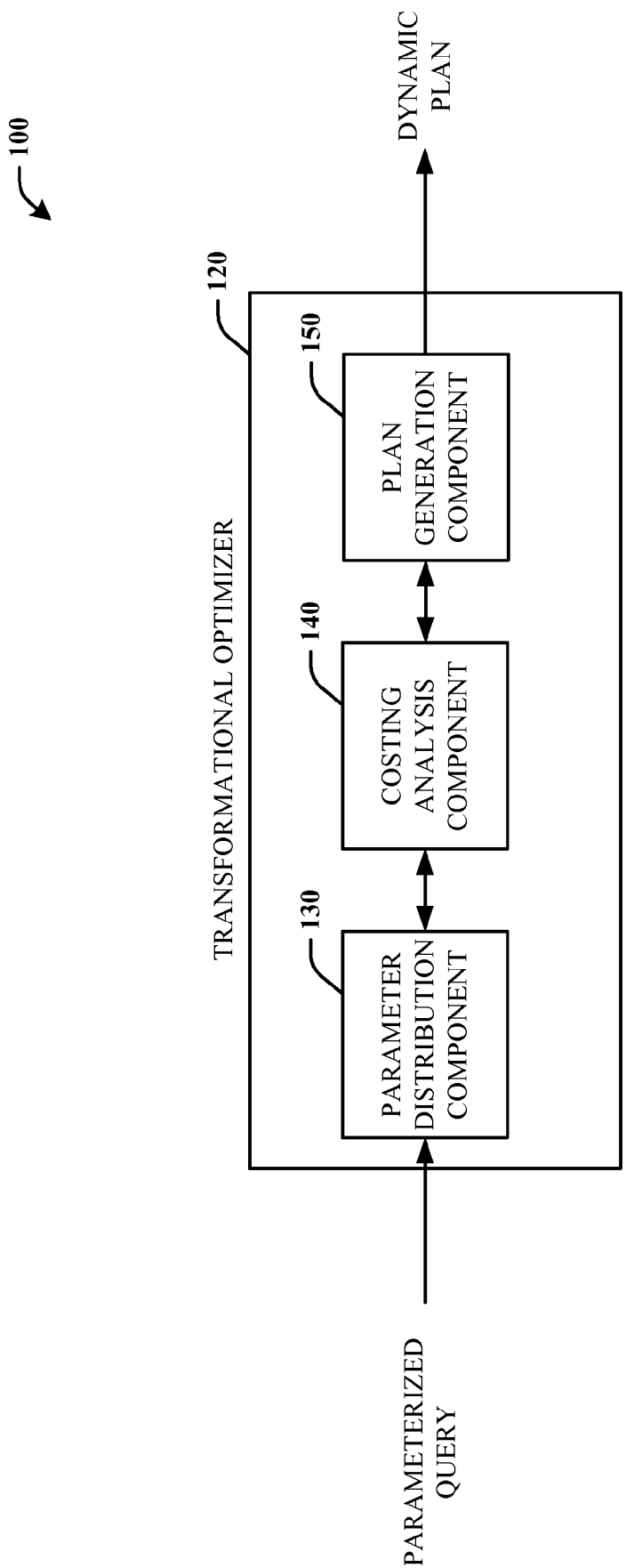
FIG. 1 is a block diagram of a query execution system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

In FIG. 1, a block diagram of a query execution system 100 that supports dynamic plan generation for executing queries is illustrated. The query execution system 100 comprises a parameter distribution component 130 that determines a limited range of parameter values useful for calculating optimal plans, costing analysis component 140 that provides cost information for given parameter values, and plan generation component 150 that generates a dynamic plan that encompasses appropriate plan options, all integrated within a transformational optimizer 120. Integration is a unique feature that provides for a more efficient optimization process.

The transformational optimizer 120 receives a parameterized query and outputs a dynamic plan. A parameterized query is a SQL query in which the constants aren't provided until runtime. An example of a parameterized query is:

```
Q1: SELECT *
FROM Orders
WHERE Orders.o_orderkey < @P1
```

In this example, the parameterized query class contains all queries with different @P1 values. A dynamic plan is the physical plan that is used to compute the query result. The plan is dynamic because it embeds more than one plan alternative within the plan. For instance, a dynamic plan may include two plan options—one plan that is invoked for high parameter values and another plan that is invoked for low parameter values.

The parameter distribution component 130 selects a representative sample of parameter values that users actually run queries with for plan optimization. These distributions can be collected through automated uniform sampling while the system is running. Since a plan space can be overwhelmingly complicated, there may be many different plans in the plan space that vary without clear correlation to the parameter values. In many situations, users may not run queries on every parameter value in the parameter space. Therefore, it is a waste of time and resources to optimize over the entire parameter space. Instead, the parameter distribution component 130 tailors optimization to the selected sample of parameter values that are actually used.

The benefits of this approach become especially apparent in circumstances where there is no predictable correlation between parameter values and cost of the resulting plan. For example, cost of a plan may not increase (or decrease) as parameter value increases. Instead, cost can sharply fluctuate with increasing parameter values. In such a case, it is difficult to find blocks of regions of parameter space that optimally correspond to the same plan, since the plans are widely scattered across the parameter space. Thus, rather than optimize over the entire parameter space, or sequential ranges of parameter space, the parameter distribution component 130 performs optimization for certain parameter values that are actually used.

The costing analysis component 140 works with the parameter distribution component 130 by providing the costing data analysis on the plans corresponding to the sample of parameter values actually used by users that the parameter distribution component 130 selects. Since costing is inherently an inexact analysis limited by the capability of the costing engine, all the costing results of plans for all analyzed parameter values are important beyond the initial performance comparison. The costing results for all the plans corresponding to the selected parameter values are further used to generate a dynamic plan.

The plan generation component 150 works with the costing analysis component 140. Since the costing analysis component 140 provides data with respect to all plans corresponding to parameter values selected for optimization, the plan generation component 150 determines which resulting plans are worth keeping as options in the final dynamic plan.

To maximize optimality, a dynamic plan would include all plan options which were optimal for some parameter setting, as determined by the costing analysis component, and would associate with each of those plan options the associated parameter settings for which those plans were optimal. For instance, if there are five parameter values determined by the parameter distribution component 130 to be a representative sample of the values actually used when queries are executed, the costing analysis component 140 would provide costing on all the plans with respect to those five parameter values and submit that information to the plan generation component 150. Each of those five parameter values could have a different most optimal plan, as determined by the costing analysis component 140. While the plan generation component 150 receives this information, a dynamic plan that solely provides maximum optimality would embed all five plan options within itself, and select the appropriate plan option for their respective parameter values.

However, the plan generation component 150 performs extra analysis to determine if a trade off of optimality may be sacrificed in favor of simplicity. Because all aspects of plan generation with this approach are fully integrated with the transformational optimizer, the plan generation component 150 can safely make a determination that for two or more plan options that are roughly equal in optimality level, a single plan option should be selected to simplify the dynamic plan. In the example above, if three of the plan options are close in performance, the switch unions to two of the plan options can be eliminated, leaving one plan option to represent all three. Accordingly, the dynamic plan would be simplified to embed just three total plan options, rather than the original five options. To ensure that the overall optimality of the dynamic plan does not fall below a certain threshold, a bound on suboptimality may be specified by a user (or indicated within the system by default) and enforced by the plan generation component 150.

Furthermore, at least a subset of a group comprising the parameter distribution component 130, the costing analysis component 140, and the plan generation component 150 is integrated into a transformational optimizer. Such integration provides numerous advantages. One advantage is the significant improvement of optimization time and expense. Without integration, the optimizer is redundantly invoked from outside and work is wastefully repeated. Integration also enables the trade off analysis of simplicity over optimality described above.

Figure 2:
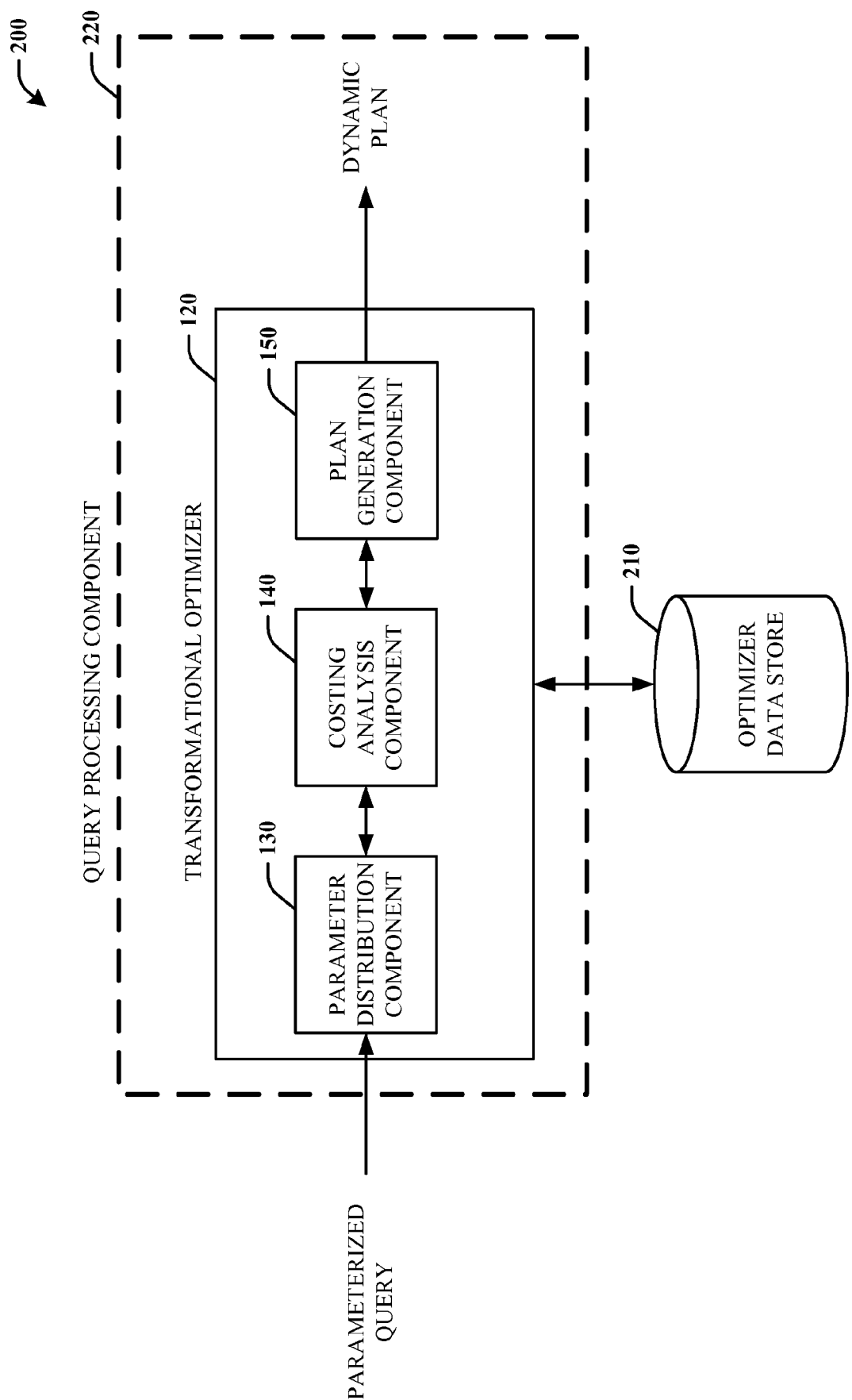
FIG. 2 is another block diagram of a query execution system.

Referring to FIG. 2, another block diagram of a query execution system 200 that facilitates dynamic plan generation is illustrated, where information relating to optimization is stored and used for better performance. The query execution system 200 comprises a parameter distribution component 130, costing analysis component 140, and plan generation component 150 that work together to analyze and create an appropriate dynamic plan for query execution. The three components 130-150 are integrated in a transformational optimizer 120, which is linked to an optimizer data store 210, and also enclosed within a query processing component 220. Maintaining a data store allows optimization information to be available when generating a dynamic plan, resulting in a more comprehensive result.

FIG. 2 emphasizes the additional feature of the optimizer data store 210 which stores information related to optimization results. For example, costing results for all plan options acquired by the costing analysis component 140 should be retained at least until the end of compilation. At the end of compilation, a structure that stores all this information along with a few peripheral structures (referred to as a memo) can be acquired by the system.

A memo is a data structure that contains a record of all expressions that the optimizer has explored or physically optimized. It consists of a set of groups. Each group references implicitly all expressions, both physical and logical, which produce the same output. The expressions within a group are called group expressions. Also associated with each group is a collection of logical properties which are invariant to all members of the group (e.g., cardinality, but not sort order).

An example of a group is illustrated in Table 1.

TABLE 1

| Example of a group | |
| --- | --- |
| Group #10 | LogOp_Join 4 6 9 |
| Cardinality 100 | PhyOp_Merge 4 6 9 |
| | PhyOp_Apply 5 7 |

In this example, this group is the 10th group in the memo, and has estimated cardinality of 100. There is one logical operator, a join, and two physical operators, which are physical implementations of that join. The logical join and the merge join have three inputs, which are the groups that produce the inner tuples (4), the outer tuples (6), and the join condition (9). The apply operator is actually a nested loops join that takes a tuple at a time from the outer and "applies" it to the inner. For instance, in the above table, if group 7 was an index lookup, and we executed the nested loops join, group 5 would generate all tuples for the outer. The PhyOp_Apply operator would then execute the index lookup described in group 7 once for each tuple from group 5. The implication for PhyOp_Apply is that the second, or inner, operator tree is executed more than once.

In other instances, there may be more than one logical operator in a group. For example, a join cummutativity rule might add [LogOp_Join 6 4 9]. This would, in turn, potentially produce more physical alternatives associated with the new join order.

The optimizer data store 210 can also retain other information relating to optimization in order to perfect the algorithm used by the plan generation component 150 to simplify plans. The entire transformational optimizer 120 and dynamic plan result is enclosed in a query processing component that manages and executes the query according to the given dynamic plan.

Figure 3:
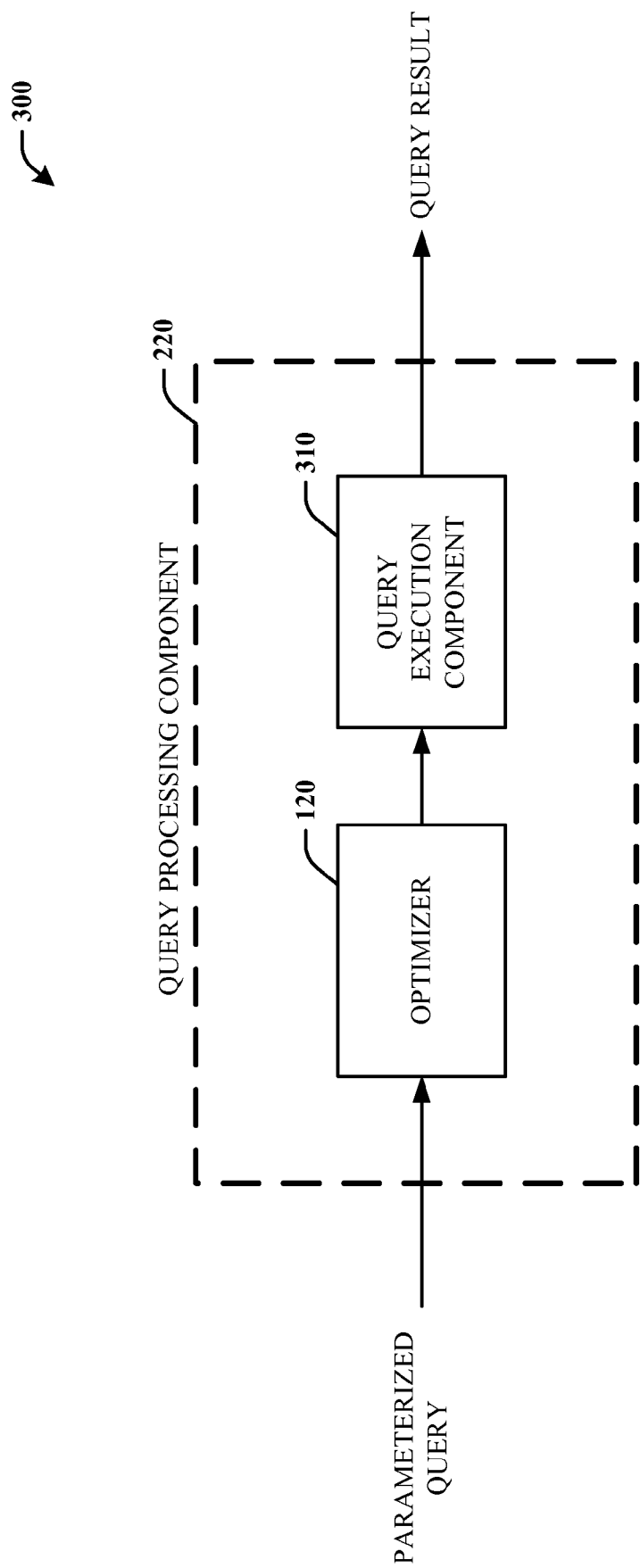
FIG. 3 is yet another block diagram of a query execution system.

Now referring to FIG. 3, yet another block diagram of a query execution system 300 is depicted, in a higher level illustration of acquiring a query result. Queries are executed using a plan, but there may be many plans that can be used to execute a given query. Each plan has its own advantages and disadvantages in the way that it operates. The query execution system 300 includes an optimizer 120 that creates a plan and query execution component 310 that executes the query with the created plan, both residing within a query processing component 220.

The query processing component 220 receives a parameterized query and provides a query result. The optimizer 120 generates a plan in which the query execution should proceed. Such selection is made by analyzing parameter values and corresponding costs of each plan option. The generated plan can be a dynamic plan, which is one that includes multiple plan options so that a different plan can be used when suitable. The dynamic plan is compiled just once and reused for multiple query executions, where the dynamic plan selects the proper alternative plan option upon every execution. The query execution component 310 executes the query using the generated plan, and outputs a query result. Various algorithms can be used to generate a plan, which will amount to differences in efficiency, cost, time, and cache usage.

Figure 4:
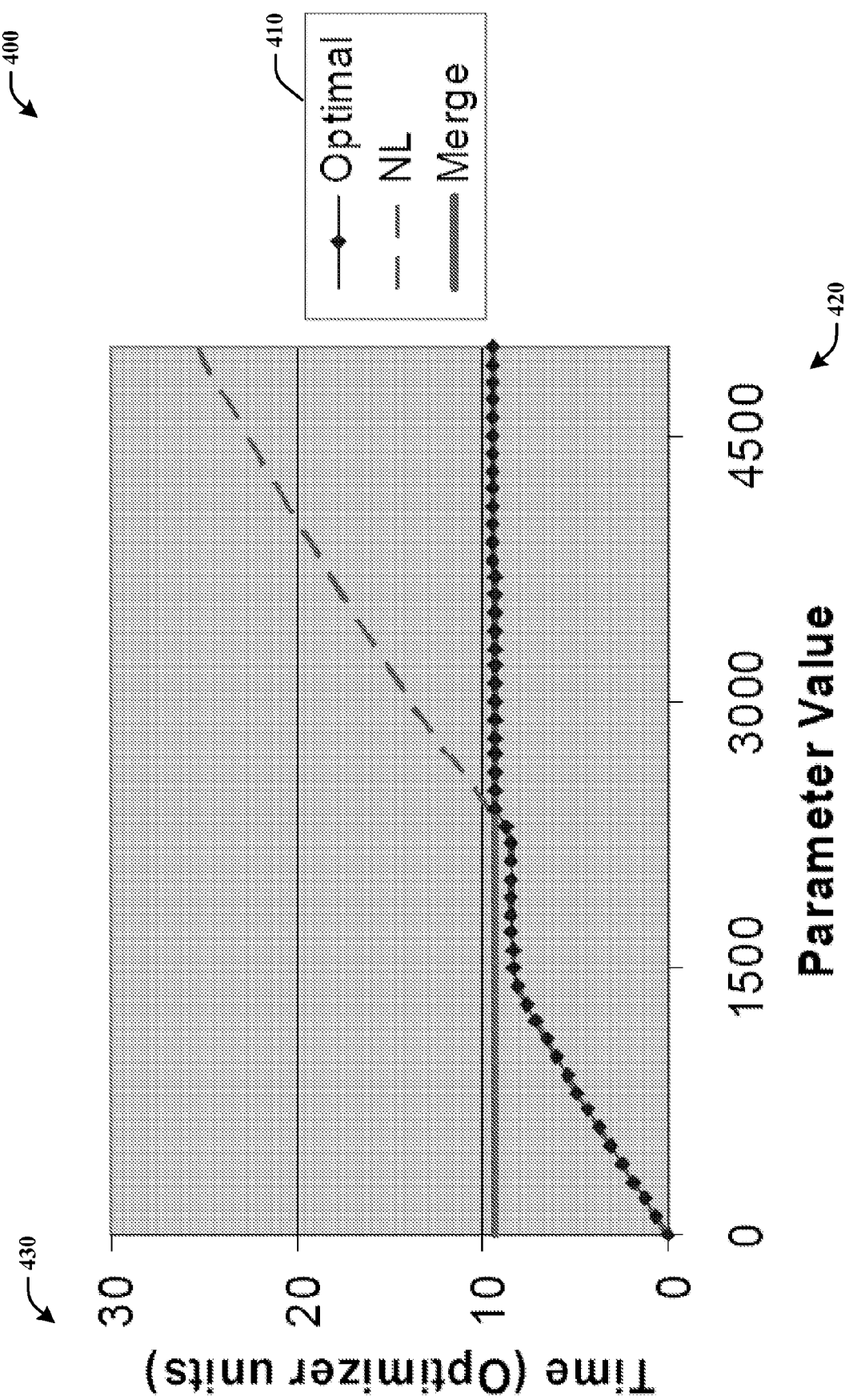
FIG. 4 is a graph of parameter value vs. optimization units for two execution plan options.

FIG. 4 illustrates a graph of parameter value vs. optimization units for an example of two execution plan options and their corresponding levels of optimality 400. The x-axis represents parameter value 420, in this example ranging from 0 to 5000 units. The y-axis represents optimizer units in time 430, in this example ranging from 0 to 30 units. The key 410 identifies two different plan options: nested loop join, as referenced by the broken line labeled "NL," and merge join, as referenced by the solid line labeled "Merge." The line referenced by the solid line superimposed with dots labeled "Optimal" represents the optimal plan selection of the two choices for any given parameter.

For the purpose of this example, two plan options are provided: nested loop join and merge join. As illustrated in the graph 400, merge join is very insensitive to the predicate and nested loop join is highly sensitive to the predicate. Also apparent from the graph 400, of the two plan options, nested loop join is more efficient for certain parameter values 420, while merge join is more efficient for other parameter values 420. Therefore, rather than picking a single plan for all parameter values, a dynamic plan can integrate both plans so that each may be selected at appropriate circumstances.

For low parameter values 420, nested loop join is the optimal choice because nested loop join appears to have a lower cost 430 than merge join for low values. For high parameter values 420, merge join is the optimal choice because merge join appears to have a lower cost 430 than nested loop join for high values. Therefore, at runtime, when a user submits a query with constant values, the system will look at those constant values and decide which of the two plan options to execute to provide for optimality.

The system utilizes a switch union, which is an operator that has k+1 inputs, where the first k inputs are alternative plans and the last input is an integer expression whose output is between 1 and k. The operator executes the plan corresponding to the result of the expression at k+1. In this illustration, the predicate switches from nested loop join to merge join at a parameter value of approximately 2500.

However, in the parameter value range 420 between roughly 1500 through 2500, the cost in time 430 is close. Since an optimizer's cost estimate is an inexact determination, it is difficult to determine whether nested loop join or merge join is the optimal plan option in this range. Rather than waste time and resources in an attempt to accurately select one plan over the other as the optimal plan, the optimizer proceeds with a more efficient algorithm. For this close range, the dynamic plan knows that both plans are similar in performance and will consistently select the same plan without regard to whether or not that plan is truly the optimal choice. Such approach allows one to make a trade off of optimality in dynamic plan structure for simplicity in dynamic plan structure. When switch unions are eliminated, dynamic plan structure is simplified because fewer plan options will remain in the dynamic plan. To prevent the suboptimality level of a dynamic plan from growing out of hand, a bound can be specified, which will limit the extent of simplicity allowed to affect the plan.

Figure 5:
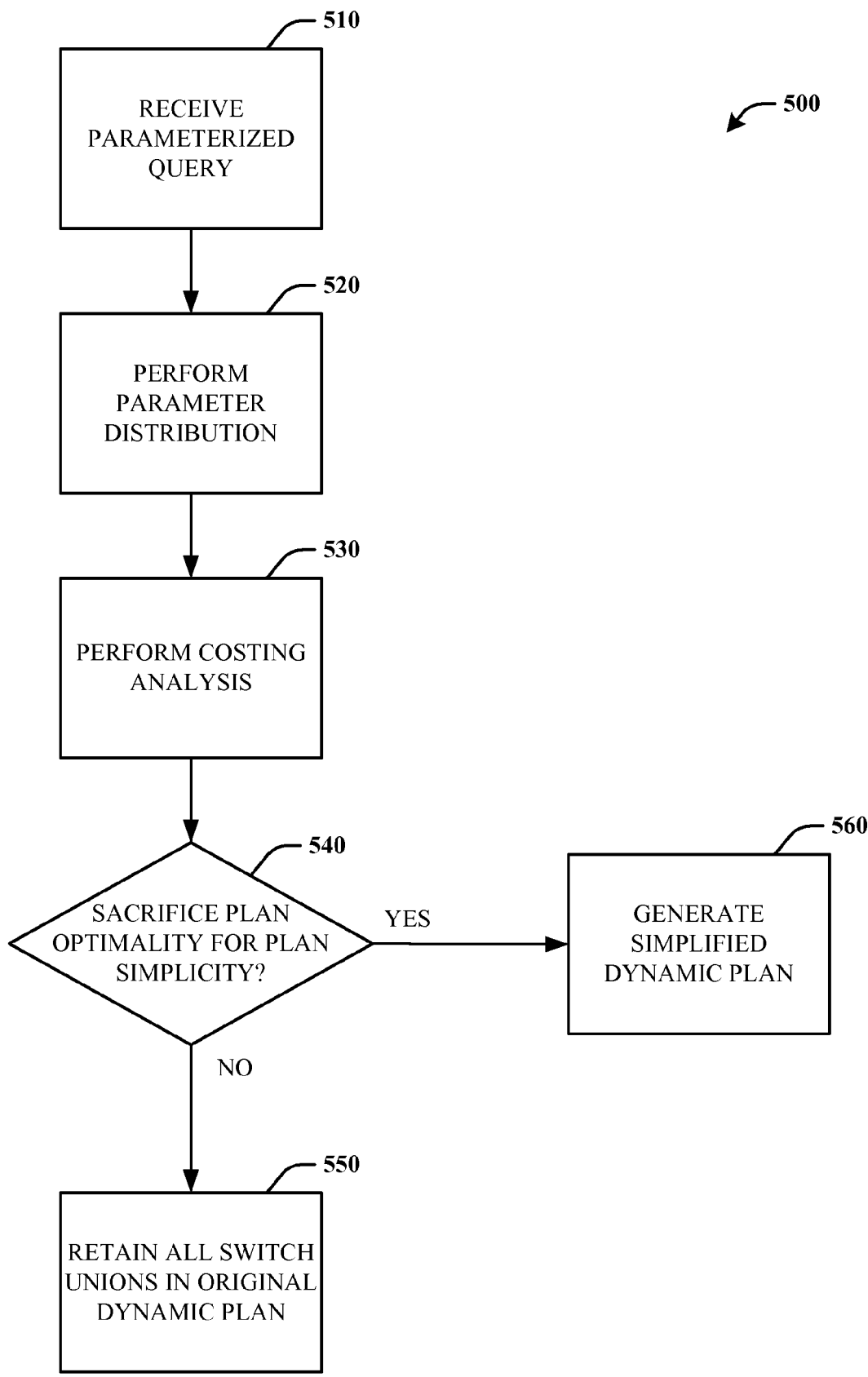
FIG. 5 is a representative flow diagram illustrating a method for facilitating dynamic plan generation.
Figure 6:
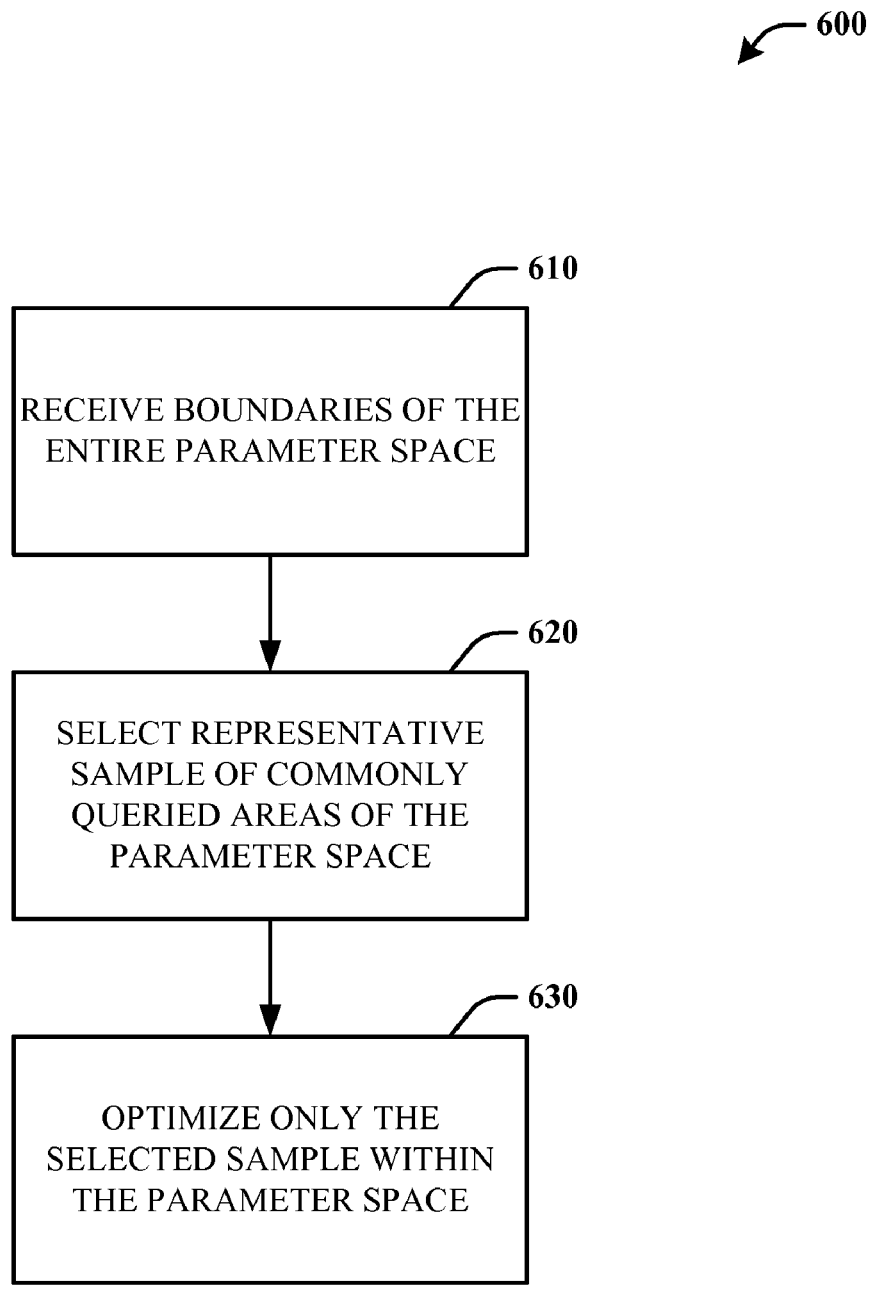
FIG. 6 is a representative flow diagram illustrating a method for facilitating parameter distribution.
Figure 7:
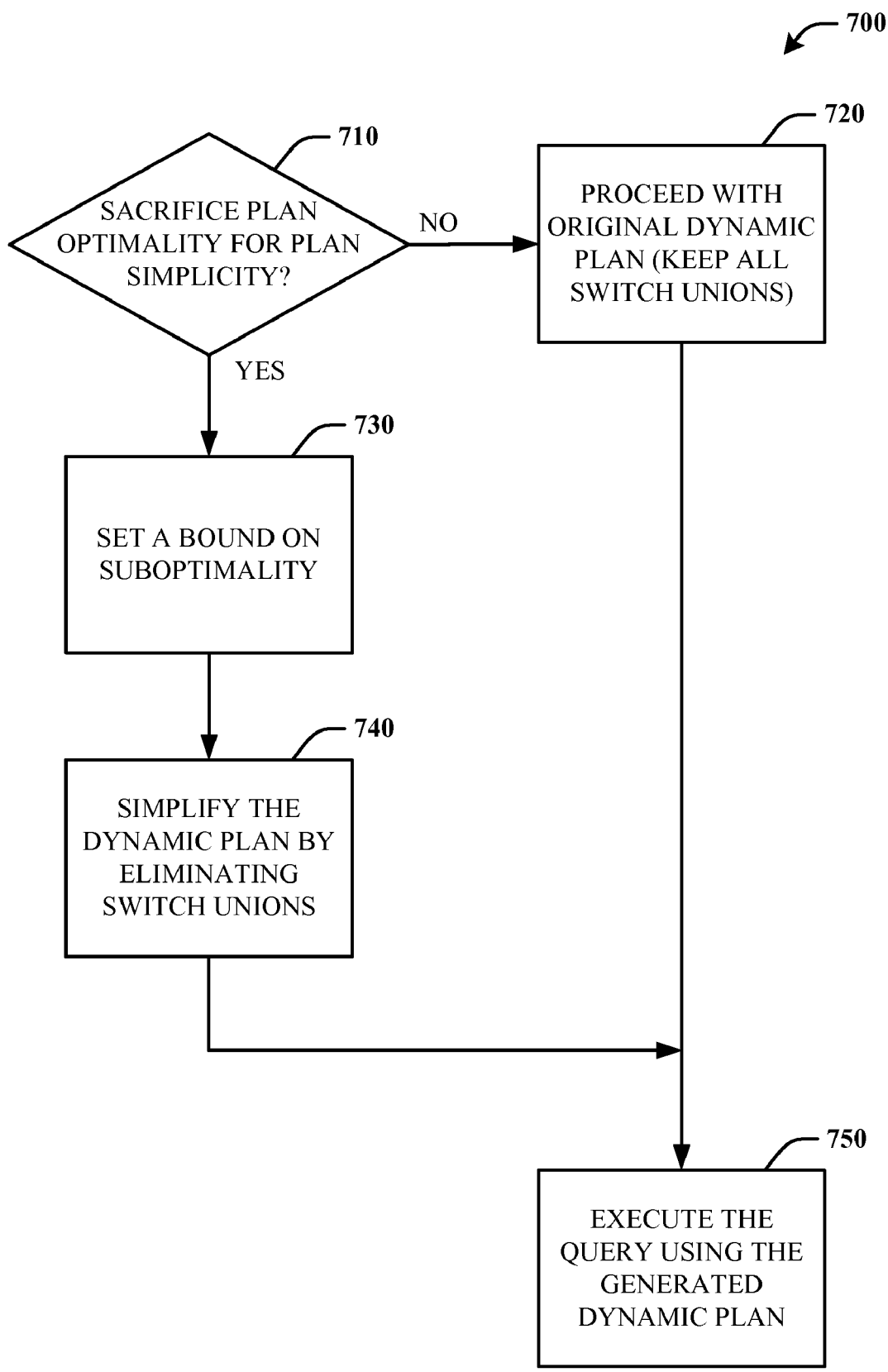
FIG. 7 is another representative flow diagram illustrating a method for facilitating dynamic plan generation and execution.

In view of the example systems shown and described above, methodologies that may be implemented in accordance with the embodiments will be better appreciated with reference to the flow charts of FIGS. 5-7. While, for purposes of simplicity of explanation, the methodologies are shown and described as a series of acts, it is to be understood and appreciated that the methodologies are not limited by the order of the acts, as some acts may occur in different orders and/or concurrently with other acts from that shown and described herein. Moreover, not all illustrated acts may be required to implement the methodologies described herein.

The methodologies may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired.

Referring specifically to FIG. 5, a method 500 for facilitating dynamic plan generation is depicted. More specifically, the method 500 describes the overall organizational process in which a dynamic plan is generated. The dynamic plan can subsequently be used to execute a received query and provide a query result.

The method 500 begins at 510, by receiving a parameterized query with constants provided. At 520, parameter distribution is performed, in which sample parameter values are selected to represent those values that users actually run queries with. The selected parameter values are not necessarily grouped in an organizational manner. In fact, the distribution can be widely spread out over the entire parameter space. Proceeding to 530, costing analysis is performed to determine the cost of using a particular plan for various parameter values. In order to generate the dynamic plan, if plan optimality is to be sacrificed for plan simplicity at 540 (e.g. a decision to reduce a maximally optimal plan in order to save time and/or resources), then a simplified dynamic plan is generated at 560 by removing inefficient switch unions that decide between two plan options similar in cost. If the dynamic plan is to retain all optimal plans as perceived by the optimizer at 540 (e.g., no simplification analysis is required and/or desired), then at 550, all switch unions should be retained in the original dynamic plan.

Continuing to FIG. 6, a method 600 for facilitating parameter distribution is depicted. In particular, the method 600 illustrates the process in which only portions of the parameter space are explored and optimized, rather than the entire space. Such approach reduces the amount of time and cost expended in plan optimization.

The method 600 starts at 610, where boundaries of the entire parameter space are received. The parameter space includes all possible parameter values for the parameterized query. Proceeding to 620, a representative sample of commonly queried areas of the parameter space is selected. For example, out of a broad range of 1,000 parameter values, only 100 of them may actually be used. Those 100 parameter values could sufficiently and practically represent the entire space. Furthermore, at 630, only the selected sample within the parameter space is optimized to determine the costs of plan options used to execute the query. Accordingly, with the example above, efforts to cover a range of 1,000 parameter values are reduced to just 100, yet appropriate accuracy and coverage are maintained.

FIG. 7 refers to another method 700 for facilitating dynamic plan generation and execution on a query to acquire a query result. The method 700 illustrates in further detail how dynamic plan simplification proceeds. Simplification refers to an option to sacrifice plan optimality in favor of a simple and reduced plan structure.

The method 700 begins at 710, where a determination is made to sacrifice dynamic plan optimality for dynamic plan simplicity. For instance, a slightly sub-optimal but simplified plan may be a better option if fewer resources would be used to support the plan. If such sacrifice is not desired or necessary, the original dynamic plan including all switch unions is retained at 720. At 750, the query executes using the original full dynamic plan.

At 710, if it is determined that plan optimality should be sacrificed for plan simplicity, then at 730, a bound on suboptimality is set. This bound ensures that the dynamic plan does not become so simple that the resulting plan is more costly than the optimal plan by a given factor (threshold). For example, a dynamic plan that retains just one plan choice is very simple, but not optimal. At 740, the dynamic plan is simplified by eliminating switch unions for plan options that are unnecessary because they are close in performance to other plan options or they are rarely used for query execution. Once the simplified dynamic plan is generated, the query is executed using the resulting plan at 750.

FIG. 8 illustrates an example of a physical optimization context 800. After parsing, the tree of logical operators is inserted into the memo. Each operator in the tree (relational and scalar) is assigned a unique group number. Logical and physical transformation rules are then applied. By commingling these rules, the optimizer, produces fully costed plans quickly, which allows optimization to terminate early when compilation time is becoming significant compared to the best found execution time.

After expressions for physical plans are inserted into the memo, a particular plan, starting at the root group, is physically optimized by iterating over the group's physical expressions. For each physical expression, the children are first physically optimized. Then the expression itself is fully costed. The resulting costs of all the physical plans in the group are then compared, and the cheapest plan chosen.

When a child group is being physically optimized, it is in the context of the parent operators, which may impose physical requirements on its children. These requirements may exclude some physical alternatives of a group from physical optimization because of the requirements imposed by the parent. For instance, in the example above, the result of the merge join, but not the nested loops join, may be guaranteed to be sorted in a particular way which is required by an operator above group 10. When the relevant operator above this group is optimizing its children, it will, in the process, recursively physically optimize group 10. While optimizing group 10 in this context, only the merge join will be considered as a valid alternative, and not the nested loops join. Different operators, and even different groups, may reference the same group as a child, and as a consequence, may consider different subsets of physical alternatives in a group during physical optimization.

Associated with each unique set of physical requirements for each group is a data structure called a PhysOptContext. This structure holds the optimal plan information associated with the set of physical requirements. It is also a stateholder while the optimizer is iterating over qualifying physical alternatives in the group.

In reference to FIG. 8, an example of PhysOptContext for group 10 after it has completed physical optimization is depicted. It has computed an optimal cost by physically optimizing all qualifying physical plans. The 3rd operator is optimal for this set of physical requirements. The two child contexts were used to physically optimize their respective groups with the set of physical requirements imposed by the nested loops join.

After physical optimization is complete, the final physical plan is extracted from the memo by recursively descending the tree of optimal child contexts starting from the root context, which was used to physically optimize the highest level group in the query.

Figures 9A, 9B:
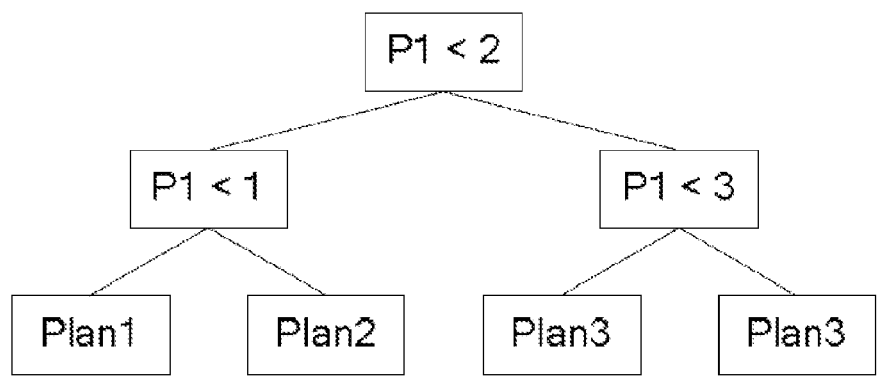
FIG. 9A is another example of a physical optimization context.
FIG. 9B is an example of a switch union tree.

Proceeding to FIG. 9A, another example of a physical optimization context 900 is illustrated. During optimization, it must be marked which groups are dependent on which parameters. This is important for two reasons. First, we need to know which groups need to compute their cardinalities for multiple parameter settings. Computing multiple cardinalities only when necessary is critical for good performance. Second, we need to know, when physically optimizing a group, whether to calculate costs for multiple parameter values.

The strategy makes use of an interesting observation: We don't need to know whether a group is dependent on parameters until we need to either compute cardinalities or cost root operators within the group. Since the cardinalities are not needed until an operator in the group is costed, cardinalities don't need to be computed until costing. Table 2 represents the basic flow of optimizing a physical plan.

TABLE 2

Original
OptimizePhysialPlan( ) - Original

1. Optimize the child groups
2. Cost the current operator
3. If the current physical plan is optimal so far, update the associated PhysOptContext appropriately In general, dependencies on parameters flow up through the memo DAG. Since we don't need to know until local operator costing whether there are dependencies, we check for dependencies after optimizing the children, but before costing the current operator. Since the same set of dependencies is present for all alternatives, parameter dependency checking only needs to be done once per group, and the result stored with the logical properties. Table 3 represents a new algorithm for physical optimization.

TABLE 3

Refinement 1
OptimizePhysialPlan( ) - Refinement 1

1. Optimize the child groups
2. The set of parameters upon which this group depends is the union of the child parameter dependencies and the local operator dependencies
3. Cost the current operator
4. If the current physical plan is optimal so far, update the associated PhysOptContext appropriately Unfortunately, there are cases where dependencies on parameters do not only flow up the memo's DAG. For instance, nested loops joins are PhyOp_Apply operators, where the second, or inner, child is executed as many times as the cardinality of the outer. As a result, an important piece of information for costing, the number of expected operator executions, actually flows sideways from the outer to the inner PhysOptContext. For instance, given the scenario in FIG. 3, if group 5 has a cardinality of 100, group 7 and all of its descendants will be executed 100 times, and are therefore dependent on the same parameters which affect the cardinality of group 5.

The number of operator executions is a physical property, residing in the physical requirements associated with a PhysOptContext. Therefore, these parameter dependencies, called push down parameter dependencies, must reside in the PhysOptContexts, not the logical properties associated with the group. As a result, these dependencies will be used during costing, but not during cardinality estimation. Table 4 illustrates a further refinement that computes these dependencies.

TABLE 4

Refinement 2
OptimizePhysialPlan( ) - Refinement 2

1. Add to the list of push down parameter dependencies all push down parameters from the parent
2. If this (physical) operator is a nested loops join
   2.1. Optimize the center
   2.2. Add to the list of push down parameter dependencies of the inner PhysOptContext all parameter dependencies of the outer group
   2.3. Optimize the inner
3. Else
   3.1. Optimize the child groups
4. The set of parameters upon which this group depends is the union of the child parameter dependencies and the local operator dependencies
5. Cost the current operator
6. If the current physical plan is optimal so far, update the associated PhysOptContext appropriately In order to generate the optimal plans for all tested parameter settings at the end of compilation, additional information is stored in the PhysOptContexts. In particular, FIG. 9A shows the additional PhysOptContext information 900 for the previous example. Instead of having 1 optimal cost, 100, we have a vector of costs. Each element of this vector is the optimal cost amongst all qualifying physical plans for a unique setting of parameters. Similarly, associated with each optimal cost is an optimal plan, which can be found in the corresponding vectors for optimal group expressions and optimal child contexts.

For the first parameter setting, the optimal cost is 130. The associated optimal plan has as its root, the second operator in the group, which was a merge join. This join has 3 children, each of which has its own PhysOptContext. Similarly, the optimal plan for the last tested parameter setting was a nested loops join with a cost of 100. This is all the information needed to extract, from the memo, the optimal plan for every tested parameter setting.

When physically optimizing a group with a set of physical requirements, all parameters upon which the expression depends both logically and physically are identified. We are guaranteed to have identified these parameters before the local operator is costed. Therefore, it is at costing that we introduce a loop which iterates over the desired set of parameter settings (combinations of all physically and logically dependent parameters), and calculates, for each setting, the cost of this physical alternative. The optimality test later in the algorithm is then replaced with a loop which checks optimality for each parameter setting. Both physical and logical parameters are used to generate these parameter settings. Table 5 illustrates the final algorithm to optimize a physical plan.

TABLE 5

Final
OptimizePhysialPlan( ) - Final

1. Add to the list of push down parameter dependencies all push down parameters from the parent
2. If this (physical) operator is a nested loops join
   2.1. Optimize the outer
   2.2. Add to the list of push down parameter dependencies of the innerPhysOptContext all parameter dependencies of the outer group
   2.3. Optimize the inner
3. Else
   3.1. Optimize the child groups
4. The set of parameters upon which this group depends is the union of the child parameter dependencies and the local operator dependencies TABLE 5-continued Final
OptimizePhysialPlan( ) - Final 5. Create the necessary arrays in the associated PhysOptContext to hold optimal costs, group expressions, and child contexts
6. For each relevant parameter combination setting (using both physically and logically dependent parameters)
   6.1. If there is no cardinality for this group available for the current (logically dependent) parameter settings, calculate the cardinality for this setting and store it in the group
   6.2. Cost the current operator using the cardinality and child optimality information associated with the current parameter settings
   6.3. If the current physical plan is optimal so far for the current parameter setting. Replace the entries in the associated PhysOptContext optimal plan arrays with the information for the current physical alternative There are some interesting details in this algorithm. While costing the current operator, we use the PhysOptContexts associated with the operator's children. Since the children have been optimized, we use the optimal child information associated with the current parameter setting.

In addition to using the child optimization results, the operator also needs a cardinality estimate for the current group and the current parameter setting. The cardinality depends only on the logically dependent parameters, not the physically dependent ones. Since the majority of optimizer time is spent calculating cardinality, we want to carefully minimize the number of cardinality estimates that the optimizer is forced to perform. Therefore, we store, with each group, an array of cardinality estimates for all logically dependent parameter settings. This array of cardinalities only needs to be calculated once since it isn't calculated until all dependent logical operators are found. These improvements are set forth in Step 5.1 and 5.2 in Table 5.

We have not specified how, for a particular collection of dependent parameters, we generate parameter settings to optimize for. Various other search algorithms may be used in conjunction with the algorithms provided. In our implementation, we select, for each parameter, a set of representative values which are uniformly sampled from the provided parameter distribution. We then optimize the parameter value combinations corresponding to the cross product of all the parameter value samples.

FIG. 9B depicts an example of a switch union tree 950. In order to construct the final plan, we walk the tree of PhysOptContexts starting at the root context, which was used to physically optimize the group corresponding to the highest level operator in the query. Table 6 outlines the original algorithm for extracting the best physical plan from the memo.

TABLE 6

Original
ExtractBestPhysicalPlan (CurContext) - Original

1. For each optimal child context of CurContext (CurChildNums = 1 to Number of Children)
   1.1. ChildPlan(CuChildNum) = ExtractBestPhysicalPlan(Current Optimal Child Context)
2. Create a copy BestOperator of the optimal physical operator associated with CurContext
3. Attach the children from the ChildPlan array to BestOperator
4. Return BestOperator The changes needed to generate the new final plans are motivated by a few observations. Since we may have different optimal plans for different parameter settings, we may need a switch union at the top of the tree produced by ExtractBest- PhysicalPlan. This switch union will have k+1 children, where k is the number of unique optimal physical plans, and the last child is a scalar predicate which is evaluated at run time, and returns a number 1 through k, corresponding to the subplan which should be activated for some given parameter value. Recall the changes made to the PhysOptContexts, depicted in FIG. 9B. The new algorithm for ExtractBestPhysicalPlan is presented in Table 7.

TABLE 7

Refinement 1
ExtractBestPhysicalPlan (CurContext) - Refinement 1

1. Determine the k unique plans referred to by the optimal group expression assay of CurContext
2. if k > 1
   2.1. For each of the k unique expressions (CurExpression = 1 to k)
      2.1.1. For each optimal child context associated with the current unique expressions (CurChildNum = 1 to Number of Children)
         2.1.1.1. ChildPlan(CurrChildNum) = ExtractBestPhysicalPlan (Current Optimal Child Context)
      2.1.2. Create a copy BestOperator of the optimal physical operator associated with the current unique expression
      2.1.3. Attach the children from the ChildPlan assay to BestOperator
      2.1.4. SwitchUnionChildren(CurExpression) = BestOperator
   2.2. SwitchUnionChildren[k + 1] = GenerateSwitchPredicate
   2.3. Return a physical switch union predicate with children SwitchUnionChildren
3. Else
   3.1. For each optimal child context of CurContext (CurChildNum = 1 to Number of Children)
      3.1.1. ChildPlan(CurChildNum) = ExtractBestPhysicalPlan (Current Optimal Child Context)
   3.2. Create a copy BestOperator of the optimal physical operator associated with CurContext
   3.3. Attach the children from the ChildPlan array to BestOperator
   3.4. Return BestOperator In order to achieve good run time performance, each switch union predicate is a tree of compare operators which performs a binary search of the parameter space. There is at most one leaf for each parameter setting that the expressions have been optimized for.

Referring specifically to the example in FIG. 9B, there are 3 optimal plans over 4 different parameter settings. For example, these parameter settings may have been P1=[0,1,2, 3]. The P1<3 comparison wasn't really necessary since both sides of the branch produce the same plan. In these situations, we remove such unnecessary branches. When there is more than one parameter, we generate a k-d tree style round robin binary search tree.

In order to generate such a tree, there must be a sort order for every parameter type. SQL provides us with this, although the sort order isn't always intuitive (e.g., Unicode strings). Also, there are cases where the sort order of the type isn't related to the plan choice. While this may, at first, seem like a problem, we handle these cases more gracefully than proposed alternatives. Since all commonly used parameter values are specified in the parameter distributions for these queries, we are guaranteed to pick the right plans for these values which try to capture the entire, infinitely complex, in these cases, plan space.

FIG. 9B highlights another important aspect of optimal plan extracting from the memo. Once the decision to use a switch union has been made, the child plans of that switch union are only responsible for covering a subset of the parameter values. For instance, using example above, plan 1 will never execute with P1>=1. It would therefore be wasteful to include, in the final plan, a switch union in plan 1 that switches from one plan to another at P1=3. Therefore, when we call ExtractBestPhysicalPlan on plan 1, we pass a list of active parameter settings. These are the settings for which plan 1 was optimal at the level above. Only these active parameter settings are considered during ExtractBestPhysicalPlan. The information associated with all other parameter settings is ignored. Table 8 represents the final algorithm for ExtractBestPhysicalPlan.

TABLE 8

Final
ExtractBestPhysicalPlan
(CurContext, ActiveParamSettings) - Final

Figure 10A:
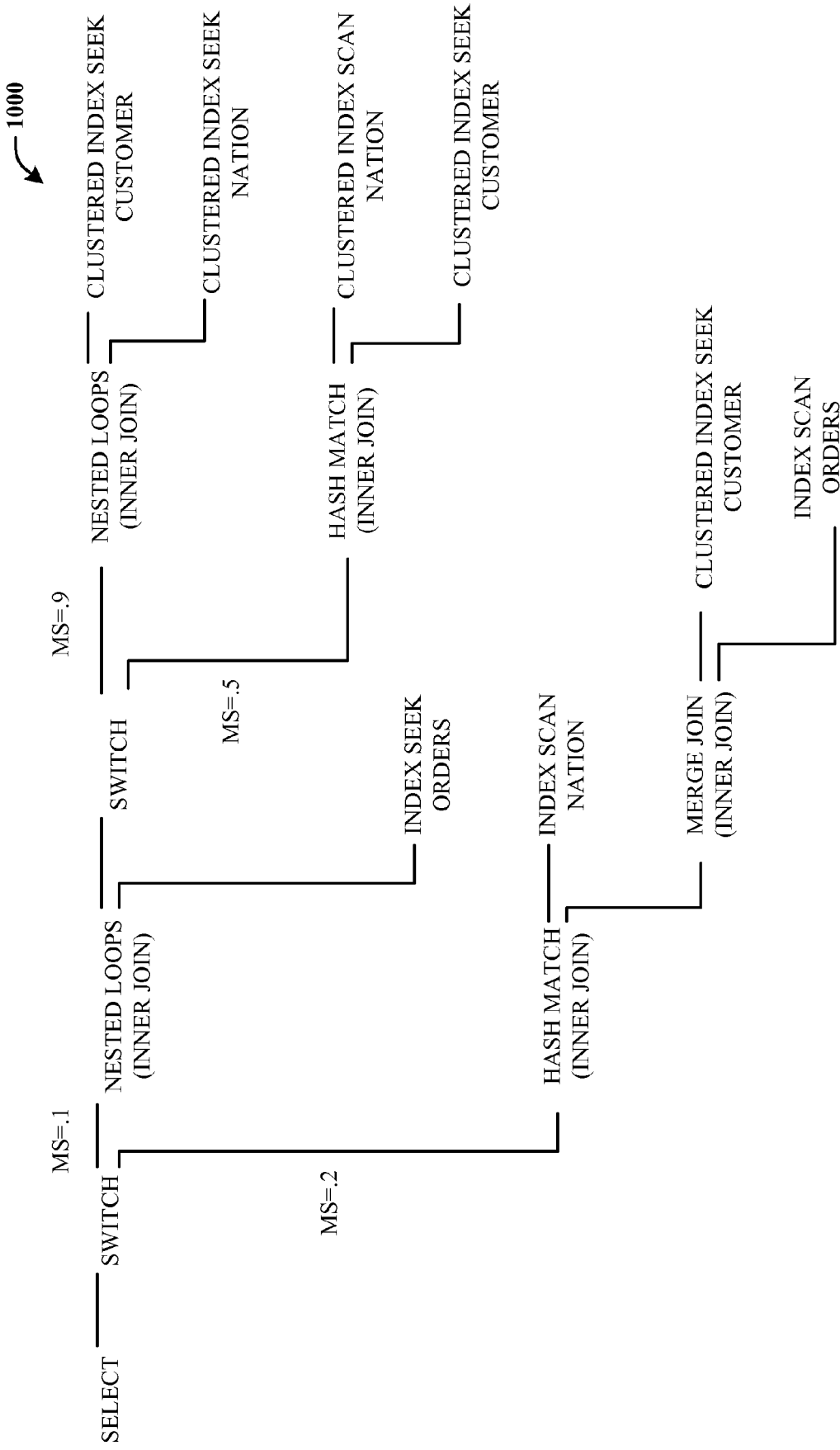
FIG. 10A is an example of a dynamic plan.
Figure 10B:
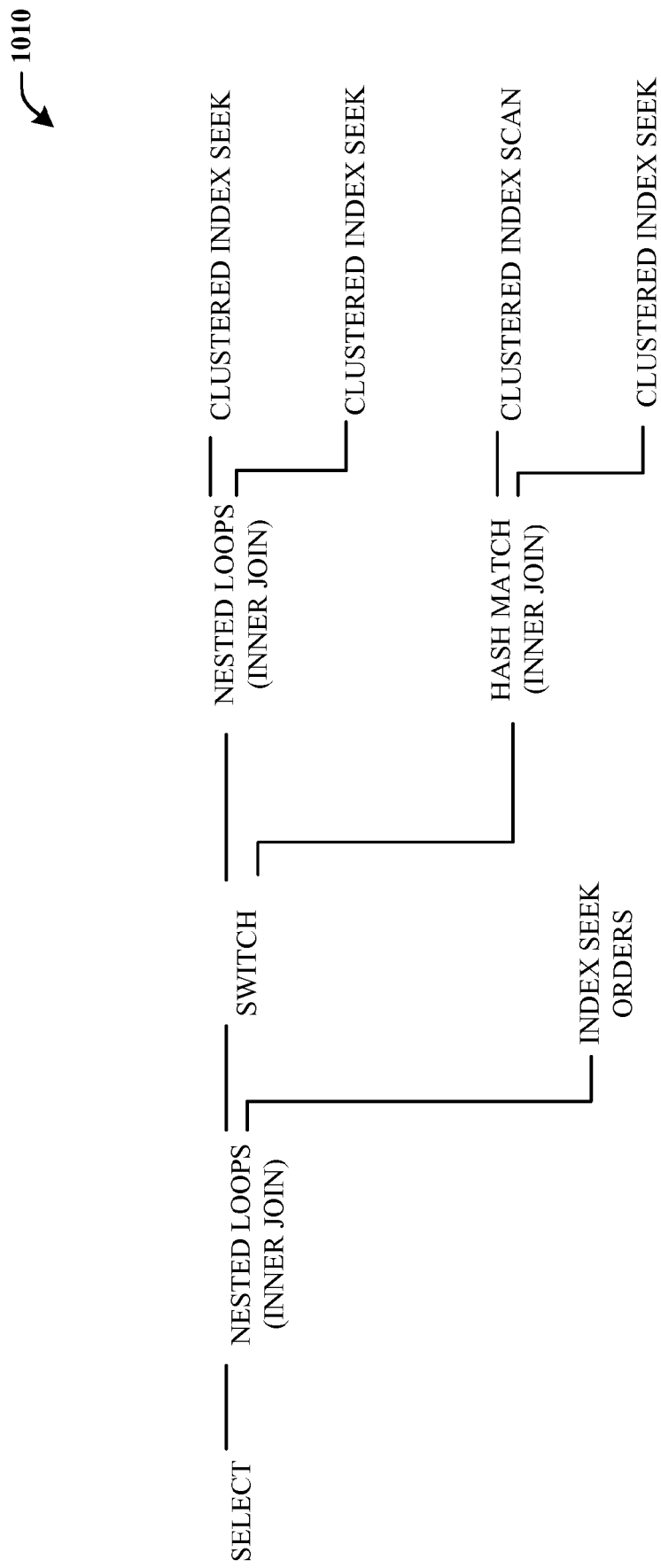
FIG. 10B is another example of a dynamic plan.
Figure 10C:
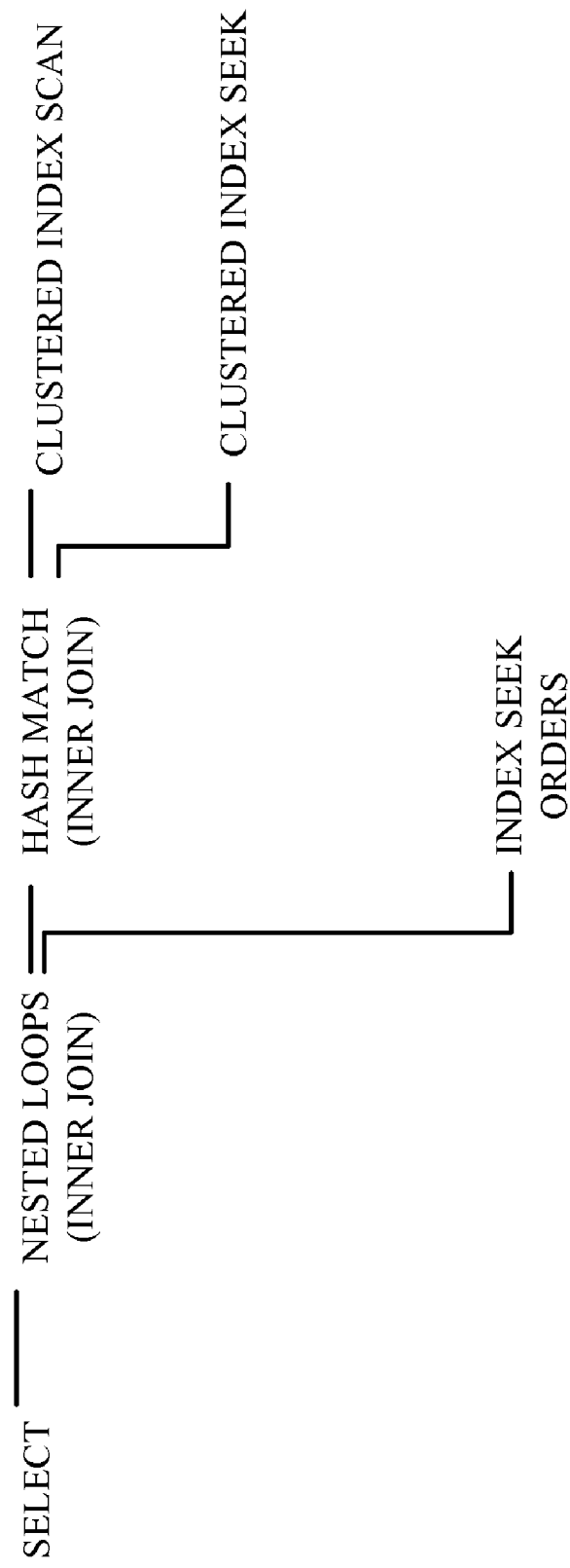
FIG. 10C is yet another example of a dynamic plan.

1. Determine the k unique plans referred to by the optimal group expression array of CurContext using only the entries associated with ActiveParamSettings
2. if k > 1
   2.1. For each of the k unique expressions (CurExpressions = 1 to k)
      2.1.1. For each optimal child context associated with the current unique expression (CurChildNum = 1 to Number of Children)
         2.1.1.1. ChildActiveParamSettings = the subset of ActiveParamSettings for which this child is optimal
         2.1.1.2. ChildPlan[CurChildNum] = ExtractBestPhysicalPlan (Current Optimal Child Context ChildActiveParamSettings)
      2.1.2. Create a copy BestOperator of the optimal physical operator associated with the current unique expression
      2.1.3. Attach the children from the ChildPlan array to BestOperator
      2.1.4. SwitchUnionChildren[CurExpression] = BestOperator
   2.2. SwitchUnionChildren[k + 1] = GenerateSwitchPredicate (ActiveParamSettings)
   2.3. Return a physical switch union predicate with children SwitchUnionChildren
3. Else
   3.1. For each optimal child context of CurContext (CurChildNum = 1 to Number of Children)
      3.1.1. ChildPlan(CurChildNum) = ExtractBestPhysicalPlan (Current Optimal Child Context ActiveParamSettings)
   3.2. Create a copy BestOperator of the optimal physical operator associated with CurContext
   3.3. Attach the children from the ChildPlan array to BestOperator
   3.4. Return BestOperator FIGS. 10A-10C depict three examples of dynamic plans. The optimization problem is solved when extracting the final plan from the memo. Ideally, we want to find the plan with a minimal number of switch unions which guarantees that the chosen plan is within some specified factor of optimal for every optimized parameter combination. Since this problem is inherently hard, we relax the problem in a number of ways.

Our approach relies on an important assumption: If an operator O1 in a plan is replaced with another, more expensive operator O2, which produces exactly the same tuples in the same order, then the change in cost of the overall plan is bounded by the difference in cost between the new operator and the operator being substituted.

We are now able to consider the elimination of each switch union in the final plan by substituting the switch union with one of its children. Because of our earlier assumption, we can bound the effect of performing this substitution according to the following Equation 1.

$$\text{OVERALL COST OF NEW PLAN} \Leftarrow \text{OVERALL COST OF OLD PLAN} + \begin{pmatrix} \text{COST OF} \\ \text{CHILD} \\ \text{SUBPLAN} \end{pmatrix} - \begin{pmatrix} \text{COST OF} \\ \text{SWITCH UNION} \\ \text{SUBPLAN} \end{pmatrix} \quad \text{Equation 1}$$

We now find, for each switch union, the child which minimizes worst case suboptimality assuming that the child is used to replace the switch union in the final plan, based on the algorithm offered in Table 9.

TABLE 9

Algorithm for finding the child which minimizes worst case suboptimality
CalculateSubstituteChild( )

1. MinMaxSuboptimalityFactor = infinity
2. For each switch union child
   2.1. MaxSuboptimalityFactor = −1;
   2.2. For each parameter setting
      2.2.1. CostDifference = Cost of child for the current parameter setting − cost of switch union plan for current parameter setting
      2.2.2. SuboptimalityFactor = CostDiffernce/Overall optimal plan cost for the current parameter setting
      2.2.3. If SuboptimalityFactor > MaxSuboptimalityFactor
         MaxSuboptimalityFactor = SuboptimalityFactor
   2.3. If MaxSuboptimalityFactor < MinMaxSuboptimalityFactor
      2.3.1. MinMaxSuboptimalityFactor = MaxSuboptimalityFactor
      2.3.2. BestChild = current switch union child
3. Return BestChild The above algorithm requires, for each of the switch union's children, the cost of the resulting subplan for all parameter settings. Since physical optimization of a group retains the optimal cost for each parameter setting, not the cost of each considered alternative for each parameter setting, we modify physical optimization to store these costs in the PhysOptContext. These costs are already computed, but only the costs optimal for particular parameter settings are preserved. PhysOptContexts therefore need an added member which stores this extra information which is normally thrown away. Now that we can select a plan to substitute for the switch union, we can associate with that switch union a cost, MinMaxSuboptimalityFactor.

We now consider for elimination all switch unions in a potential final plan, including the ones that were eliminated due to active parameter analysis. The inclusion of these switch unions is necessary since the elimination of a switch union in the query plan may reveal a switch union which was eliminated due to active parameter analysis. Using this expanded set of switch unions, we first sort the switch unions by their elimination cost. We can then remove the least expensive switch unions such that the sum of their elimination costs is less than the predefined threshold, as viewed in Table 10.

TABLE 10

Algorithm for removing the lease expensive switch unions
SimplyPlans( )

1. For each switch union in the final plan before active parameter analysis
   1.1. Select the child to replace the switch union
   1.2. Set the elimination cost of the switch union to MinMaxSuboptimalityFactor from the previous step
2. Sort the switch unions by elimination cost
3. TotalEliminationCost = Cheapest switch union elimination cost TABLE 10-continued Algorithm for removing the lease expensive switch unions
SimplyPlans( )

4. While (TotalEliminationCost < Threshhold) and (The list of switch unions is nonempty)
   4.1. Mark the PhysOptContext associated with the cheapest switch union
   4.2. Remove the cheapest switch union from the list
   4.3. TotalEliminationCost += Cheapest switch union elimination cost Once the relevant PhysOptContexts have been marked, extracting the final plan proceeds exactly as before, except that when a marked PhysOptContext is encountered, no switch union is generated. Instead, the appropriate child is substituted.

FIG. 10A demonstrates the overall manner in which this algorithms works and shows the optimal switch union plan for the following SQL query:

Q4: SELECT c_custkey,c_name,n_regionkey,o_orderkey
FROM customer, orders, nation
WHERE c_custkey = o_custkey
AND c_nationkey = n_nationkey
AND c_custkey < @pml
OPTION(OPTIMIZE FOR
(@pml=0, @pml=100, @pml=200,..., @pml=50000))

The plan in FIG. 10A is annotated with the MaxSuboptimality value of each child for each switch union. Active parameter analysis has not been applied to reduce the plan size.

After performing the described analysis on the MinMaxSuboptimalityFactors of the switch union children, we pick the nested loops child for the highest switch union, and the hash match child for the deeper switch union. The result of the analysis is then as follows:

If Threshold <= 0.1, we output the entire plan;
If 0.1< Threshold <= 0.6 we output the plan in FIG. 10B;
If Threshold > 0.6, we output the plan in FIG. 10C.

While these approximations are significant, the solution is O(nlogn) where n is the number of switch unions (because of the sort). This can easily become $O(n^2)$ once the above approximations are eliminated.

Figure 11:
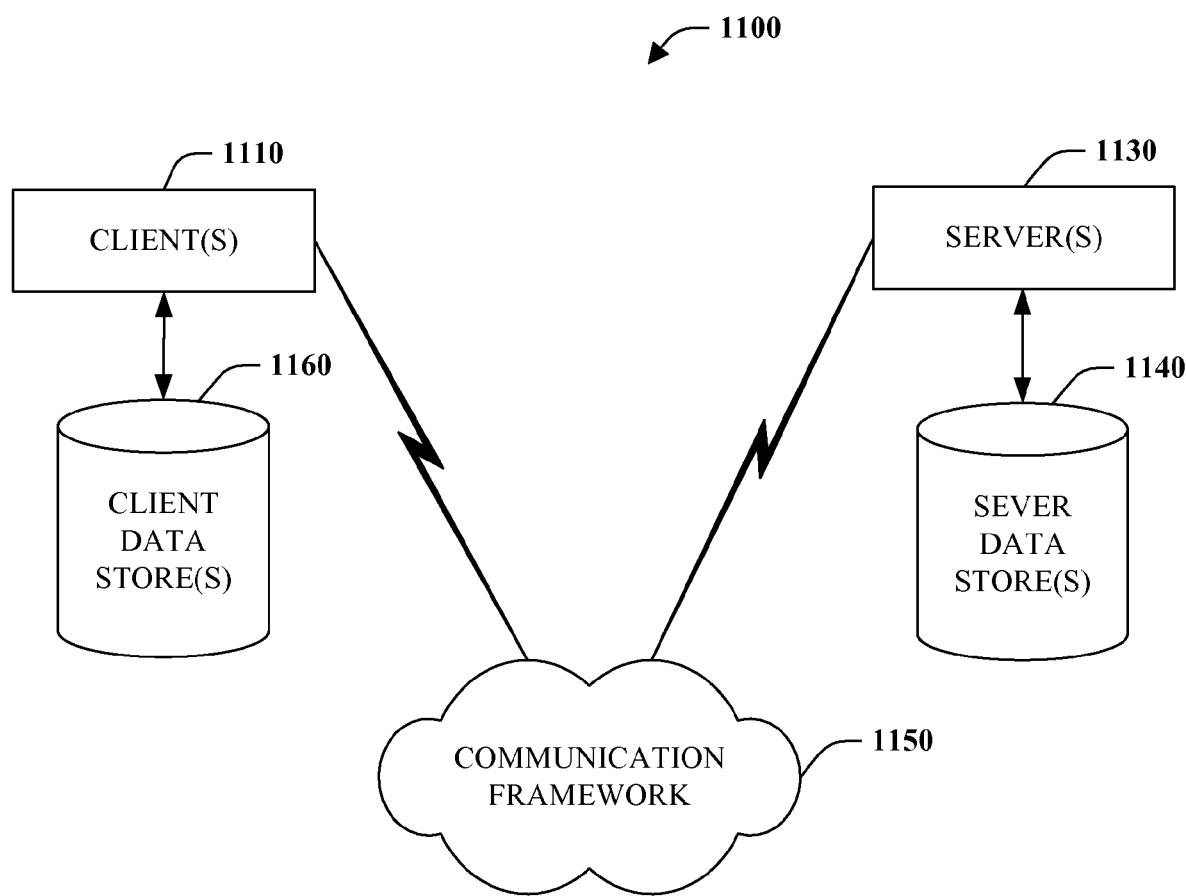
FIG. 11 is a schematic block diagram of a sample-computing environment.

In order to provide a context for the various aspects of the disclosed subject matter, FIG. 11 as well as the following discussion are intended to provide a brief, general description of a suitable environment in which the various aspects of the disclosed subject matter may be implemented. While the claimed subject matter has been described above in the general context of computer-executable instructions of a computer program that runs on a computer and/or computers, it can be recognized that the claimed subject matter also may be implemented in combination with other program modules. Generally, program modules include routines, programs, components, data structures, etc. that perform particular tasks and/or implement particular abstract data types. Moreover, it can be appreciated that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects can be practiced on stand-alone computers. In a distributed computing environment, program modules may be located in both local and remote memory storage devices.

FIG. 11 is a schematic block diagram of a sample-computing environment 1100 with which the present invention can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing the present invention, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130.

It is to be appreciated that the systems and/or methods described herein can be facilitated with computer components and non-computer related components alike. Further, it can be ascertained that the systems and/or methods described above are employable in a vast array of electronic related technologies, including, but not limited to, computers, servers, and/or handheld electronic devices, and the like.

What has been described above includes examples of the claimed subject matter. It is, of course, not possible to describe every conceivable combination of components or methodologies for purposes of describing such subject matter, but it can be recognized that many further combinations and permutations of the embodiments are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for generating a dynamic plan comprising:
a processor;
and memory in communication with the processor, the memory comprising:
a parameter distribution component that receives a parameterized query and selects a representative sample of parameter values based on parameter values employed by users to execute queries in view of an entire parameter space;
a costing analysis component that calculates costs of plan options corresponding to the selected representative sample of parameter values employed by users to execute queries, the plan options set forth execution of queries; and
a plan generation component that: (i) generates the dynamic plan, the dynamic plan generated by incorporating at least two plan options as a function of the calculated costs of plan options corresponding to the selected representative sample of parameter values employed by users to execute queries, the at least two plan options comprising a first plan invoked for relatively higher parameter values and a second plan invoked for relatively lower parameter values, (ii) adjusts the dynamic plan based on a balance of optimality and simplicity, and (iii) maximizes simplicity of the dynamic plan while staying within a predetermined bound of suboptimality.

2. The system of claim 1, the parameter distribution component, the costing analysis component, and the plan generation component are integrated into a transformational optimizer.

3. The system of claim 1, the plan generation component receives cost information of plan options that are suboptimal from the costing analysis component and eliminates switch unions in the dynamic plan based on the cost information.

4. The system of claim 1, further comprising: a query execution component that determines a query result based on query execution using the dynamic plan.

5. A method that facilitates dynamic plan generation, comprising the following acts:
extracting and optimizing for a sample of parameter values from a parameter space based on commonly used parameter values employed by users to execute queries;
calculating costs associated with a plurality of query execution plan options that provide support for query execution;
generating a dynamic query execution plan that integrates at least two query execution plan options based on the calculated costs of plan options corresponding to the selected representative sample of parameter values employed by users to execute queries;
tuning the dynamic plan as a function of query execution optimization and simplicity of plan structure, wherein the cost of the tuned dynamic plan is bound by:

$$X<=Y+(A-B)$$

where X represents the cost of the tuned dynamic plan, Y represents the cost of the dynamic plan prior to tuning, A represents the cost of a child subplan within the dynamic plan prior to tuning, and B represents the cost of a switch union subplan within the dynamic plan prior to tuning; and executing a parameterized query with the dynamic query execution plan.

6. The method of claim 5, further comprising randomly selecting a query execution plan option when two or more query execution plan options have one of identical and similar calculated costs.

7. The method of claim 5, further comprising maximizing simplicity of the dynamic plan within a user-defined bound of suboptimality.

8. The method of claim 5, further comprising retaining and using the calculated cost information for future dynamic plan generation.

9. The method of claim 5, further comprising allowing a user to specify changes to the dynamic query execution plan.

10. The method of claim 5, further comprising minimizing a number of switch unions in the dynamic query execution plan for an established optimization level of the dynamic query execution plan, the number of switch unions is a function of the number of query execution plan options in the dynamic query execution plan.

* * * * *